US012679725B2

(12) United States Patent
    Balaji et al.

(10) Patent No.:    US 12,679,725 B2
(45) Date of Patent:        Jul. 14, 2026

(54) FLEXIBLE PROCESS FOR CONVERTING CARBON DIOXIDE, HYDROGEN, AND METHANE INTO SYNTHESIS GAS

(71) Applicant: SHELL USA, INC., Houston, TX (US)

(72) Inventors: Sayee Prasaad Balaji, Amsterdam (NL); Mark Klokkenburg, Amsterdam (NL); Robert Schouwenaar, Amsterdam (NL); Dominik Johannes Michael Unruh, Amsterdam (NL); Jose Atilio Quevedo Enriquez, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 716 days.

(21) Appl. No.: 17/922,483

(22) PCT Filed: May 28, 2021

(86) PCT No.: PCT/EP2021/064403
    § 371 (c)(1),
    (2) Date: Oct. 31, 2022

(87) PCT Pub. No.: WO2021/244980
    PCT Pub. Date: Dec. 9, 2021

(65) Prior Publication Data
    US 2023/0192482 A1     Jun. 22, 2023

(30) Foreign Application Priority Data

Jun. 1, 2020    (EP) ..................................... 20177669

(51) Int. Cl.
    C01B 3/14        (2006.01)
    C01B 3/363       (2026.01)
    C10K 3/02        (2006.01)

(52) U.S. Cl.
    CPC ................ *C01B 3/14* (2013.01); *C01B 3/363* (2013.01); *C10K 3/026* (2013.01);
    (Continued)

(58) Field of Classification Search
    CPC ... C01B 3/14; C01B 3/363; C01B 2203/0255; C01B 2203/0283; C01B 2203/0822; C01B 2203/1241; C01B 2203/82; C10K 3/026
    (Continued)

(56)        References Cited

U.S. PATENT DOCUMENTS 2,898,204 A    8/1959 Totzek
    3,723,344 A    3/1973 Reynolds
        (Continued)

FOREIGN PATENT DOCUMENTS

AU        472920 B2     6/1976
    CN        103170339 B    10/2016
        (Continued)

OTHER PUBLICATIONS

International Search Report and Written Opinion received for PCT Patent Application No. PCT/EP2021/064403, mailed on Aug. 10, 2021, 11 pages.
    (Continued)

*Primary Examiner* — Coris Fung
(74) *Attorney, Agent, or Firm* — SHELL USA, INC.

(57)        ABSTRACT

The present invention relates to a process for converting feed streams selected from (1) a gas stream comprising carbon dioxide and a hydrogen rich gas stream; (2) a methane rich gas stream; and (3) a combination of feed streams (1) and (2) into a product stream comprising carbon monoxide, water and hydrogen. The process may include introducing feed streams selected from (1), (2) or (3) and oxygen into a reaction vessel and switching modes between (Continued)

performing method I or method II in the reaction vessel wherein no catalyst is present. The reaction vessel may be provided with a burner located at the top of the reaction vessel, the burner may include coaxial channels for the separate introduction of the different gas streams. Method I may be a reverse water gas shift reaction at elevated temperature. Method II may be a partial oxidation reaction at elevated temperature.

10 Claims, 7 Drawing Sheets

(52) U.S. Cl.
CPC ................. *C01B 2203/0255* (2013.01); *C01B 2203/0283* (2013.01); *C01B 2203/0822* (2013.01); *C01B 2203/1241* (2013.01); *C01B 2203/82* (2013.01)

(58) Field of Classification Search
USPC ........................................................ 252/373
See application file for complete search history.

(56) References Cited

U.S. PATENT DOCUMENTS

| | | | |
|---|---|---|---|
| 3,738,940 | A | 6/1973 | Auer et al. |
| 3,919,114 | A | 11/1975 | Reynolds |
| 5,496,530 | A | 3/1996 | Vannby et al. |
| 5,714,657 | A | 2/1998 | Devries |
| 6,096,106 | A * | 8/2000 | Ruhl ........................ B01J 8/008 |
| | | | 422/204 |
| 7,090,789 | B2 | 8/2006 | Schioedt et al. |
| 7,435,759 | B2 | 10/2008 | Jung et al. |
| 7,498,001 | B2 | 3/2009 | Tonkovich et al. |
| 7,846,979 | B2 | 12/2010 | Rojey et al. |
| 7,906,098 | B2 | 3/2011 | Kuperman et al. |
| 8,658,554 | B2 | 2/2014 | Dorner et al. |
| 9,249,079 | B2 | 2/2016 | Mamedov et al. |
| 10,041,670 | B2 | 8/2018 | Disselhorst et al. |
| 11,078,077 | B2 | 8/2021 | Maass et al. |
| 2004/0175327 | A1 | 9/2004 | Hagemeyer et al. |
| 2006/0211777 | A1 | 9/2006 | Severinsky |
| 2009/0012188 | A1 | 1/2009 | Rojey et al. |
| 2009/0224209 | A1 | 9/2009 | Eilers et al. |
| 2009/0313886 | A1 | 12/2009 | Hinman et al. |
| 2010/0000874 | A1 | 1/2010 | Hinman et al. |
| 2010/0292076 | A1 | 11/2010 | Wagner et al. |
| 2013/0034478 | A1 | 2/2013 | Doty |
| 2014/0127121 | A1 | 5/2014 | Maass et al. |
| 2014/0288195 | A1 | 9/2014 | Castelli et al. |
| 2014/0315711 | A1 | 10/2014 | Kumar et al. |
| 2015/0129805 | A1 | 5/2015 | Karpenko et al. |
| 2015/0307352 | A1 | 10/2015 | Kumar et al. |
| 2015/0336795 | A1 | 11/2015 | Kern et al. |
| 2016/0052785 | A1 | 2/2016 | Maass et al. |
| 2016/0296916 | A1 | 10/2016 | Kim et al. |
| 2016/0332874 | A1 | 11/2016 | Mamedov |
| 2017/0080407 | A1 | 3/2017 | Schunk et al. |
| 2017/0197829 | A1 | 7/2017 | Andersen |
| 2018/0327261 | A1 | 11/2018 | Ott et al. |
| 2019/0359894 | A1 | 11/2019 | Heidel et al. |
| 2020/0217279 | A1 * | 7/2020 | Asai ........................ F02M 25/12 |
| 2021/0246034 | A1 | 8/2021 | Kaisalo et al. |
| 2022/0048776 | A1 | 2/2022 | Balaji et al. |

FOREIGN PATENT DOCUMENTS

| | | |
|---|---|---|
| CN | 109201048 A | 1/2019 |
| DE | 102015015968 A1 | 6/2017 |
| EP | 3050865 A1 | 8/2016 |
| FR | 2963932 A1 | 2/2012 |
| JP | 3834621 B2 | 10/2006 |
| JP | 5402683 B2 | 1/2014 |
| KR | 101864602 B1 | 6/2018 |
| WO | 9709293 A1 | 3/1997 |
| WO | 2013135664 A1 | 9/2013 |
| WO | 2014180888 A1 | 11/2014 |
| WO | 2017067648 A1 | 4/2017 |
| WO | 2017072649 A1 | 5/2017 |
| WO | 2017077421 A1 | 5/2017 |
| WO | 2018219986 A1 | 12/2018 |

OTHER PUBLICATIONS

Vázquez et al., "Catalyst Screening and Kinetic Modeling for Co Production by High Pressure and Temperature Reverse Water Gas Shift for Fischer-tropsch Applications", Industrial & Engineering Chemistry Research, Jul. 3, 2017, vol. 56, Issue No. 45, pp. 13262-13272.

Bustamante et al., "Kinetic Study of the Reverse Water Gas Shift Reaction in High-temperature, High-pressure Homogeneous Systems", Fuel Chemistry Division Preprints, Aug. 2002, vol. 47, Issue No. 2, pp. 663-664.

International Search Report and Written Opinion received for PCT Patent Application No. PCT/EP2021/064385, mailed on Aug. 6, 2021, 11 pages.

Zonetti et al., "The NixCe0.75Zr0.25—xO2 Solid Solution and the RWGS", Applied Catalysis A: General, Apr. 5, 2014, vol. 475, pp. 48-54.

Su et al., "Designing of Highly Selective and High-temperature Endurable Rwgs Heterogeneous Catalysts: Recent Advances and the Future Directions", Journal of Energy Chemistry, Sep. 2017, vol. 26, Issue No. 5, pp. 854-867.

Meiri et al., "Simulation of Novel Process of Co2 Conversion to Liquid Fuels", Journal of Co2 Utilization, Jan. 1, 2017, vol. 17, pp. 284-289.

Wolf et al., "Syngas Production via Reverse Water-gas Shift Reaction Over a Ni—al2o3 Catalyst: Catalyst Stability, Reaction Kinetics, and Modeling", Chemical Engineering & Technology, Jun. 1, 2016, vol. 39, Issue No. 6, pp. 1040-1048.

Lee et al., "The Power of Molten Salt in Methane Dry Reforming: Conceptual Design With a Cfd Study", Chemical Engineering and Processing—Process Intensification, 2021, vol. 159, Issue No. 11, 14 Pages.

International Search Report and Written Opinion received for PCT Patent Application No. PCT/EP2021/086210, mailed on Mar. 23, 2022, 11 pages.

Ye et al., "Effect of modifiers on the activity of a Cr2O3/ Al2O3catalyst in the dehydrogenation of ethylbenzene with CO2", Green Chemistry, Issue 7, May 31, 2005, pp. 524-528.

International Search Report and Written Opinion received for PCT Patent Application No. PCT/EP2019/083047, mailed on Jan. 27, 2020, 10 pages.

Dai et al., "Reduction of Co2 to Co via Reverse Water-gas Shift Reaction Over Ceo2 Catalyst", Korean Journal of Chemical Engineering, 2018, vol. 35, Issue No. 2, pp. 421-427.

Liu et al., "Reverse Water-Gas Shift Reaction Over Ceria Nanocube Synthesized by Hydrothermal Method", Catalysis Communications, 2016, vol. 76, pp. 1-6.

Kovacevic et al., "Effects of Morphology of Cerium Oxide Catalysts for Reverse Water Gas Shift Reaction", Catalysis Letters, 2016, vol. 146, pp. 770-777.

Inamuddin et al., "Thermochemical Conversion of Carbon Dioxide to Carbon Monoxide by Reverse Water-Gas Shift Reaction over the Ceria-Based Catalyst", Conversion of Carbon Dioxide into Hydrocarbons vol. 1 Catalysis, Environmental Chemistry for a Sustainable World, vol. 40, pp. 43-61.

Office Action Received for Chinese Application No. 201980075239. 6, Mailed on Feb. 10, 2023, 17 Pages (9 Pages of English Translation and 8 Pages of Official Copy).

* cited by examiner

Method I

Method II

Method I

Method II

FLEXIBLE PROCESS FOR CONVERTING CARBON DIOXIDE, HYDROGEN, AND METHANE INTO SYNTHESIS GAS

CROSS REFERENCE TO RELATED APPLICATIONS

This is a National stage application of International application No. PCT/EP2021/064403, filed 28 May 2021, which claims priority of European Patent application No. 20177669.7, filed 1 Jun. 2020 which is incorporated herein by reference in its entirety.

FIELD OF THE INVENTION

The present invention relates to a flexible process for converting feed streams selected from a gas stream comprising carbon dioxide and a hydrogen rich gas stream; a methane rich gas stream; and a combination of said feed streams into a product stream comprising carbon monoxide, water and hydrogen.

The process is useful for reducing the carbon footprint of certain industrial technologies. Further, the process and process unit are useful in the production of synthesis gas.

BACKGROUND OF THE INVENTION

In the recent decades the increase in concentration of greenhouse gases, especially carbon dioxide, has resulted in global warming. In order to mitigate global warming, it is important to reduce the global carbon footprint. Under the Paris climate agreement, current emissions must be fully stopped until around 2070. To realize these reductions, the energy scenario of the world must evolve to move away from conventional carbon-based fossil fuel energy carriers towards introducing renewables in the energy mix which decreases the carbon dioxide concentration in the atmosphere. Renewable energy sources offer the potential of decarbonizing the energy scenario, but the main challenge with renewable energy is its intermittency. In order to transition from the current fossil fuel-based energy carriers to renewable energy carriers, several intermediate steps/processes are required. Energy conservation, improvements in energy efficiency and electrification play a role in enabling the energy transition, but also efforts to use carbon dioxide to produce other compounds play an important role as a substitute for fossil fuel-based feedstock. For example, synthesis gas (i.e. a mixture of hydrogen and carbon monoxide) may be produced from carbon dioxide. Synthesis gas is a building block to produce several useful chemicals and fuels.

Historically, synthesis gas is usually produced from steam reforming using for example natural gas as feedstock, or partial oxidation of coal, heavy oil residue or natural gas feedstock. All these processes involve the production of carbon dioxide as a by-product of the steam reforming reactions or partial oxidation reactions. In order to truly decrease the carbon dioxide concentrations, utilization of fossil fuel-based feedstock is not a viable solution. As an alternative, the reverse water gas shift (RWGS) reaction may be used to prepare syngas, using carbon dioxide as a starting material. However, the reaction of carbon dioxide with hydrogen via the RWGS reaction to produce carbon monoxide and water is endothermic in nature. Sufficient thermal energy must be supplied to the reactants (i.e. carbon dioxide and hydrogen) to facilitate the endothermic RWGS reaction. Substantial carbon monoxide is produced from carbon dioxide at temperatures beyond 600° C. reaching a maximum at temperatures around 1200° C. RWGS reaction at lower temperatures at around 600-1000° C. require catalysts to enable the conversion of carbon dioxide to carbon monoxide. These catalysts must be able to withstand high temperatures as well as be resistant to catalyst poisons such as compounds containing sulphur.

WO2020114899A1 is an earlier filed but non-prepublished application. WO2020114899A1 relates to a process for converting carbon dioxide and hydrogen into a product stream comprising carbon monoxide, water and hydrogen.

US20180327261 relates to a burner for producing synthesis gas by partial oxidation of liquid or gaseous, carbon-containing fuels in the presence of an oxygen-containing oxidant and a moderator, where steam or carbon dioxide or else mixtures of these materials can be used as moderator.

CA2866987A1 discloses a process for preparing synthesis gas which is suitable for alternating operation between two different modes of operation. The process of CA2866987A1 requires the presence of a catalyst and uses electrical heating for an endothermic reaction of carbon dioxide with hydrocarbons, water and/or hydrogen.

Currently, the status of RWGS developments have been on lab scale (Catalyst Screening and Kinetic Modeling for CO Production by High Pressure and Temperature Reverse Water Gas Shift for Fischer-Tropsch Applications, Francisco Vidal Vazquez, Peter Pfeifer, Juha Lehtonen, Paolo Piermartini, Pekka Simell and Ville Alopaeus, Ind. Eng. Chem. Res. 2017, 56, 13262-13272; Kinetic study of the reverse water gas shift reaction in high-temperature, high pressure homogeneous systems, Felipe Bustamantel, Robert Enick, Kurt Rothenberger, Bret Howard, Anthony Cugini, Michael Ciocco and Bryan Morreale, Fuel Chemistry Division Preprints 2002, 47(2), 663). For large scale conversion of carbon dioxide there is a need to be able to more efficiently and economically carry out the RWGS reaction. Achieving high conversion of carbon dioxide selectively to carbon monoxide and avoiding by-products like methane and carbon formation requires high temperatures of around 1200° C. which necessitates high heat transfer from external furnaces which pose considerable engineering challenges while scaling up to large scales. It is therefore imperative that a novel RWGS process is required to efficiently convert carbon dioxide to carbon monoxide at high temperatures at a large scale.

Another challenge with the RWGS process is addressing the challenge of intermittency with renewable power which provides hydrogen and potentially oxygen for the RWGS process. In a time period where there is no renewable power, e.g. in the absence of sufficient daylight or wind, battery storage systems are needed which are currently unavailable on the industrial scale desired and are expensive. As a consequence, the traditional thermo-chemical downstream processes to produce fuels and chemicals from synthesis gas cannot operate continuously. Therefore, a novel process is required that can operate flexibly between a RWGS mode during the period when renewable energy is available, efficiently converting carbon dioxide and hydrogen to carbon monoxide, and a conventional partial oxidation mode during times of intermittency, efficiently converting natural gas and oxygen to carbon monoxide and hydrogen at a large scale. This flexible process must also be cheap and must be able to switch from one mode to the other seamlessly such that the downstream processes receive a constant feed supply of synthesis gas from such a flexible process.

The process of the present disclosure provides a solution to said need.

SUMMARY OF THE INVENTION

Accordingly, the present disclosure relates to a process for converting feed streams selected from (1) a gas stream comprising carbon dioxide and a hydrogen rich gas stream;

(2) a methane rich gas stream; and (3) a combination of feed streams (1) and (2) into a product stream comprising carbon monoxide, water and hydrogen, the process comprising introducing feed streams selected from (1), (2) or (3) and oxygen into a reaction vessel, wherein the process comprises in switching mode performing method I or method II in the reaction vessel wherein no catalyst is present, the reaction vessel being provided with a burner located at the top of the reaction vessel, the burner comprising coaxial channels for the separate introduction of the different gas streams:

(method I) performing a reverse water gas shift reaction at elevated temperature, wherein (a) at least feed stream (1) and an oxygen rich gas stream are introduced into the reaction vessel via the burner in separate feed streams, wherein the hydrogen rich gas stream is introduced into the reaction vessel at a temperature between 15 and 500° C., (b) the hydrogen rich gas stream and oxygen rich gas stream being introduced in close vicinity of, but not next to, each other, wherein the hydrogen and oxygen in the hydrogen rich gas stream and oxygen rich gas stream undergo a combustion reaction upon entering the reaction vessel, thereby providing the heating energy required for the reverse water-gas shift reaction; and (c) the temperature in the reaction vessel is maintained in the range of 1000 to 1500° C. by varying the molar ratio of hydrogen to oxygen, which are introduced into the reaction vessel in the hydrogen rich gas stream and oxygen rich gas stream, respectively; and (method II) performing a partial oxidation reaction at elevated temperature, wherein (d) at least feed stream (2) and an oxygen rich gas stream are introduced into the reaction vessel via the burner in separate feed streams, (e) feed stream (2) and the oxygen rich gas stream being introduced in close vicinity of each other, wherein feed stream (2) and the oxygen rich gas stream undergo a partial oxidation reaction upon entering the reaction vessel; and (f) the temperature in the reaction vessel is maintained in the range of 1100 to 1500° C. by varying the flow rate of oxygen and/or feed stream (2);

wherein during the switching mode from method I to method II or vice-versa, the feed streams are gradually changed to the relevant feed streams, so that feed stream (3) is present in an intermediate phase, the feed streams being introduced via the appropriate channels, while also changing the temperature of the reactor to the desired temperature for the relevant method. During the switching mode, an intermediate phase may exist wherein the feed stream (3) and an oxygen rich gas stream are introduced into the reaction vessel while the temperature in the reaction vessel is maintained in the range of 1000 to 1500° C. during this intermediate phase. Temperature control takes place by regulating the flow of one or both of the feed stream (3) and the oxygen rich gas stream such that no external heating nor cooling is required in this case during temperature transition from method I to method II or vice-versa.

Further, the present disclosure relates to a reaction vessel provided with a burner at the top of the vessel comprising coaxial channels, the inlets of the burner connected to separate lines provided with valves for introduction of different feed streams selected from hydrogen, natural gas, carbon dioxide and oxygen. A further aspect of the invention is a process line up comprising one or multiple of said reaction vessels, wherein each of the reaction vessels has its own separate lines provided with valves for introduction of different feed streams. Advantageously, said process line up is used for performing in each of the multiple reaction vessels a process selected from method I and method II.

According to the presently claimed process, the use of a catalyst is not needed. Further, introduction of the feed streams proceeds through the same burner in both methods I and II, while the reactions take place in the same reaction vessel.

Advantageously, in the present process, the heat required for the reverse water gas shift reaction is provided by the combustion of oxygen and hydrogen inside the reactor.

The present process, reaction vessel and process line up enable the flexible conversion of either hydrocarbon gases in the presence of oxygen via partial oxidation, or a carbon dioxide containing stream (from off gases and/or from a carbon dioxide capture unit and/or from flue gases) in the presence of hydrogen rich stream via reverse water gas shift, to a carbon monoxide comprising product stream at high temperatures in a single reactor unit. The heat required for both the partial oxidation and reverse water gas shift reaction, respectively, is provided by combustion of the feed gases with oxygen in the same unit. Switching from the partial oxidation reaction to the reverse water gas shift reaction, or vice versa, happens seamlessly. There is no need to shut down the reactor nor to change any equipment inside the reactor. Maximum conversion of natural gas and carbon dioxide to carbon monoxide may be achieved. Since the reactions take place in switching mode in the same reaction vessel, the CAPEX of the present process is significantly lower than the CAPEX of known processes that are performed in separate units.

The outlet product stream comprising hydrogen and carbon monoxide, also called syngas, can be used for various applications such as Fischer-Tropsch process, methanol synthesis, olefin and alcohol synthesis, among others.

DETAILED DESCRIPTION OF THE DISCLOSURE

The present disclosure relates to a process for converting different feed streams into a product stream comprising mainly carbon monoxide, and hydrogen and water, along with unconverted feed components comprising carbon dioxide and methane. According to the present disclosure, the feed streams are selected from feed streams (1) and (2), and feed stream (3) in an intermediate phase. Advantageously, the feed streams can be selected at any point in time without change in equipment or stopping the process. Preferably, the process is a process wherein feed streams can be selected without change in equipment or stopping the process by either gradually increasing the flow of feed stream (1) while gradually decreasing the flow of feed stream (2), and vice versa, by opening and closing valves of the respective feed streams feeding to the burner, while continuing the flow of oxygen and adapting that as required. In a particular embodiment, the percentage of the feed streams (1) and (2) in feed stream (3) may be varied over time as required along with the variation of the oxygen rich gas stream.

A gas stream comprising carbon dioxide herein means a gas stream comprising from 1% to 100% carbon dioxide by volume. Sources of the carbon dioxide may be diverse, such as for example, but not limited to carbon dioxide captured from air or from flue gases, off-gases, and the like. The gas stream comprising carbon dioxide comprises carbon dioxide and may also comprise other gases, for example, hydrocarbons such as methane, ethane, propane, butane, pentane, inert gases such as argon, other gases such as nitrogen, oxygen, traces of hydrogen, carbon monoxide, or combinations of all the mentioned gases thereof. Preferably, the gas stream comprising carbon dioxide contains carbon dioxide in the range of 30 to 100 volume %, and even more preferred 70 to 100 volume %.

According to the invention, feed stream (2) is a methane rich gas stream, which is a gas stream comprising methane as a main component, optionally other components, such as ethane, propane, butane, pentane, carbon dioxide, carbon monoxide, water, argon, nitrogen, compounds of sulphur or combinations of all the mentioned gases thereof. Sources of the methane rich gas stream may be diverse, such as for example natural gas fields, process streams, off gases, and the like. Preferably, the methane rich gas stream contains methane in the range of 50 to 100 volume %, and even more preferred 70 to 100 volume %.

The hydrogen rich gas stream comprises hydrogen as a main component, suitably at least 35 volume % of hydrogen, and may optionally comprise other components, such as oxygen, nitrogen, water or combinations thereof. Preferably, the hydrogen rich gas stream comprises high purity hydrogen typically of 50% and higher by volume, particularly 65% and higher by volume, and especially 95% and higher by volume.

The oxygen rich gas stream comprises oxygen, and may optionally comprise other components, such as nitrogen, hydrogen, water or combinations thereof. Preferably, the oxygen rich gas stream comprises of high purity oxygen typically of 70% and higher by volume, particularly 80% and higher by volume, and specifically 90% and higher by volume.

According to the present disclosure, the reverse water gas shift reaction in the reaction vessel takes place at elevated temperature in the range of 1000 to 1500° C. in the absence of a catalyst, wherein heat energy is needed to sufficiently activate carbon dioxide with hydrogen and convert it into carbon monoxide and water. Preferably, the temperature is maintained in the range of 1100 to 1300° C. The pressure maintained in the reactor vessel is in the range of 1 bar to 80 bar. Preferably, the pressure in the reaction vessel is from 5 to 70 bar.

According to the present disclosure, the partial oxidation reaction in the reaction vessel is exothermic in nature and takes place at elevated temperature in the range of 1100 to 1500° C. in the absence of a catalyst. The partial oxidation reaction converts the methane rich gas stream and the oxygen rich gas stream into carbon monoxide, hydrogen and water. Preferably, the temperature is maintained in the range of 1200 to 1400° C. The pressure maintained in the reactor vessel is in the range of 1 bar to 80 bar. Preferably, the pressure in the reaction vessel is from 5 to 70 bar.

In the process according to the present disclosure, the hydrogen rich gas stream is introduced into the reaction vessel at a temperature between 15 and 450° C., in particular between 100 and 300° C., more particularly between 150 and 250° C., and especially between 220 and 240° C.

According to the present disclosure, the oxygen rich gas stream is introduced into the reaction vessel at room temperature or at a slightly elevated temperature. Preferably, the oxygen rich gas stream is introduced into the reaction vessel at a temperature between 15 and 300° C., in particular between 100 and 280° C., more particularly between 120 and 260° C., and especially between 220 and 260° C.

According to the present disclosure, the gas stream comprising carbon dioxide is introduced into the reaction vessel at room temperature or at a slightly elevated temperature. Preferably, the gas stream comprising carbon dioxide is introduced into the reaction vessel at a temperature between 15 and 700° C., in particular between 100 and 600° C., more particularly between 150 and 500° C., and especially between 200 and 450° C.

According to the present disclosure, any optional additional gas stream that is introduced into the reaction vessel as co-feed or pre-mixed gas stream, is introduced at room temperature or at a slightly elevated temperature. Preferably, the optional additional gas stream is introduced into the reaction vessel at a temperature between 15 and 500° C., in particular between 50 and 450° C.

According to the present disclosure, the methane rich gas stream is introduced into the reaction vessel at room temperature or at a slightly elevated temperature. Preferably, the gas stream comprising carbon dioxide is introduced into the reaction vessel at a temperature between 15 and 700° C., in particular between 100 and 600° C., more particularly between 150 and 500° C., and especially between 200 and 450° C.

In the process according to the present disclosure, the gas stream comprising carbon dioxide, the hydrogen rich gas stream, the methane rich gas stream, and the oxygen rich gas stream are introduced into the reaction vessel via a burner comprising coaxial channels, which may have different slit widths, for the separate introduction of the different gas streams, potentially at different velocities, the velocities of gases in the channels being preferably between 1-200 m/s, more preferably between 3-120 m/s. These velocity ranges vary depending on the feed stream. Burner construction may require providing an angle to burner tips to accommodate them within a target burner mouth opening. Preferably, the angle of the burner tip end is between 1-90 degrees, preferably between 20-65 degrees, for each of the coaxial channels. See for example FIG. 9. Burners suitable for this purpose are known in the art, such as described in WO2015011114. In the process according to the present disclosure, the burner is located at the top of the reaction vessel.

According to the present disclosure, in method I, at least part of feed (1) comprising hydrogen rich gas stream, and the oxygen rich gas stream advantageously undergo an exothermic reaction near the tip of the burner providing the heat energy required for the endothermic reverse water gas shift reaction to occur. Since this reaction is exothermic, the excessive heat energy may cause damage to the burner. In order to prevent the hydrogen rich gas stream and the oxygen rich gas stream from reacting in close vicinity of the burner outlet, part of the gas stream containing carbon dioxide is introduced via a channel in between the hydrogen rich gas stream and the oxygen rich gas stream, the oxygen rich gas stream being introduced via the inner channel(s) of the burner, and the remaining part of the gas stream containing carbon dioxide is introduced in an outer channel of the burner, being outside of the channels for the hydrogen rich gas stream and oxygen rich gas stream, to prevent overheating of the burner due to high heat energy caused by the reaction of the hydrogen rich gas stream and the oxygen rich gas stream inside the reaction vessel. As described above, the temperature of the reaction vessel is maintained at an elevated temperature in the range of 1000 to 1500° C., preferably, in the range of 1100 to 1300° C. The temperature in the reaction vessel is maintained by adjusting the flow of oxygen rich gas to the reaction vessel.

According to the present disclosure, in method II, the feed stream (2) comprising methane rich gas stream, and the oxygen rich gas stream are advantageously introduced in close vicinity to each other via separate channel(s) of the burner to prevent them from pre-mixing. The methane rich gas stream and the oxygen rich gas stream advantageously undergo an exothermic reaction near the tip of the burner. As described above, the temperature of the reaction vessel is maintained at an elevated temperature in the range of 1100 to 1500° C., preferably, in the range of 1200 to 1400° C. The temperature in the reaction vessel is maintained by adjusting the flow of oxygen rich gas to the reaction vessel.

The product stream at the outlet of the reverse water gas shift reaction vessel mainly comprises of carbon monoxide, hydrogen, water, unconverted carbon dioxide, or combinations thereof in addition to other trace components, if present in the feed streams (1), (2) and the oxygen rich gas stream.

According to the present disclosure, the reaction vessel is provided with a burner situated at the top of the vessel comprising coaxial channels. The inlets of these channels of the burner are connected to separate lines provided with valves for introduction of different feed streams selected from hydrogen, natural gas, carbon dioxide and oxygen. The valves control the flow rate of the different feed streams to the burner and are capable of advantageously starting or stopping the flow of a particular feed stream. A further aspect of this invention is that one or more feed lines with separate valves can be connected advantageously to a single burner channel. By opening (fully or partly) and closing these valves further regulating the flow rate of one or more the feed streams to the burner channel is possible. The feed streams (1), (2) along with the oxygen rich gas stream proceed through the same burner in both method I and II. The reverse water gas shift reaction and the partial oxidation reaction that take place in method I and II take place in the same reaction vessel.

According to the present disclosure, the process can switch mode from method I to method II or vice-versa seamlessly in the same reaction vessel without stopping the process. During the switching process, the flow rates of the appropriate feed streams are increased or decreased gradually with the help of opening/closing of the valves in the feed lines until the desired feed streams for the relevant method enter the reaction vessel via the appropriate burner channels. During the switching process, the temperature in the reaction vessel either increases or decreases gradually until it reaches the desired temperature for the relevant method as a consequence of changing feed streams. No external heating or cooling is required to reach the desired temperatures during switching from method I to method II or vice versa. The change in flow rates of the feed streams in the appropriate channels are carried out in an advantageous manner as required by the process. During the switching mode from method I to II or vice versa, feed stream (3) is present in the reaction vessel during this intermediate phase. During the intermediate phase, the temperature of the reaction vessel is between the desired temperatures of method I and method II. This kind of switching mode ensures that the reaction vessel need not be shut down nor changing any equipment inside the reactor is needed, since both the partial oxidation and reverse water gas shift reaction take place in the same vessel using the same burner channel. Since we do not need separate reaction vessels for the partial oxidation and reverse water gas shift processes, the CAPEX of the present process is significantly lower than the CAPEX of known processes that are performed in separate units.

Different downstream applications require different ratio of hydrogen to carbon monoxide in the product stream. The ratio of hydrogen to carbon monoxide by volume at the outlet of the reaction vessel for both method I and method II are in the range of 0.5 to 5, preferably in the range of 1 to 2. The ratio of the hydrogen to carbon dioxide by volume at the inlet of the reaction vessel for method I varies from 1 to 5, preferably between 2 and 3.5. The ratio of hydrogen to carbon dioxide is adjusted such that the required hydrogen to carbon monoxide ratio in the product stream is obtained. For method II, the ratio of methane in feed stream (2) to oxygen by volume at the inlet of the reaction vessel varies from 1 to 5, preferably between 1 and 2.5. The ratio of methane to oxygen is adjusted such that the required hydrogen to carbon monoxide ratio in the product stream is obtained.

According to the present disclosure, the reaction vessel is preferably preheated, in particular in the range from 25° C. up to 1100° C., to initiate the partial oxidation reaction or the reverse water gas shift reaction. The preheating of the reaction vessel may be performed by recirculating around the reaction vessel a mixture of hot gases resulting, for example, from the combustion of natural gas and air. Alternatively, other options for preheating may be used, like electrically heating.

In the process according to the present disclosure, the product stream exiting the reaction vessel is cooled with water to provide a cooled product mixture mainly comprising carbon monoxide, hydrogen, steam and unconverted carbon dioxide. The cooling process advantageously transfers heat energy from the product stream to the cooling water to produce steam.

Preferably, in the process of this disclosure, one or more feed streams selected from feed streams (1) and (2) along with the oxygen rich gas stream are preheated before being introduced into the reaction vessel. The hydrogen rich gas stream is preheated to a temperature between 15 and 450° C., in particular between 100 and 300° C., more particularly between 150 and 250° C., and especially between 220 and 240° C. The oxygen rich gas stream is preheated to a temperature between 15 and 300° C., in particular between 100 and 280° C., more particularly between 120 and 260° C., and especially between 220 and 260° C. The gas stream comprising carbon dioxide is preheated to a temperature between 15 and 700° C., in particular between 100 and 600° C., more particularly between 150 and 500° C., and especially between 200 and 450° C. The methane rich gas stream is preheated to a temperature between 15 and 700° C., in particular between 100 and 600° C., more particularly between 150 and 500° C., and especially between 200 and 450° C.

The product stream or the steam produced from cooling water is used to advantageously preheat one or more of the feed streams (1), (2) and oxygen rich gas stream, including the gas stream comprising carbon dioxide, methane rich gas stream, hydrogen rich gas stream and optionally additional gas streams introduced into the reaction vessel as co-feed or pre-mixed gas streams that enter the reaction vessel. Alternatively, one or more of the feed streams (1), (2), including the gas stream comprising carbon dioxide, methane rich gas stream, hydrogen rich gas stream, oxygen rich gas stream, and optionally additional gas streams can be preheated externally by other forms of heating including electrical heaters. Preheating one or more of these feed streams increases the efficiency of the reverse water gas shift and the partial oxidation processes.

According to the present disclosure, preferably at least part of the hydrogen rich gas stream and/or at least part of the oxygen rich gas stream in the feed is obtained from a water splitter. A water splitter is a device that splits water into hydrogen and oxygen. Such a water splitter may be, among others, electrolysis of water using electrical energy, photo electrochemical water splitting, photocatalytic water splitting, thermal decomposition of water and other known in the art methods of water splitting. A preferred water splitter is an electrolyzer. Energy sources for the water splitting will advantageously be provided by renewable power sources, such as solar and/or wind energy.

According to the present disclosure, the oxygen rich gas stream from the water splitter may optionally and advantageously be liquified, optionally stored, and re-gasified before use as feed.

According to the present disclosure, the cooled product stream mainly comprising carbon monoxide, hydrogen, steam, and some unconverted carbon dioxide, is subjected to further cooling at least to, and beyond, the dew point to provide a gas stream mainly comprising of carbon monoxide, hydrogen, some unconverted carbon dioxide, and liquid water which can then be separated from the product gas stream. Separators suitable for this purpose are known to people skilled in the art. The liquid water stream thus separated can optionally be recycled back to the water splitter. As long as the product stream exiting the separator comprising carbon monoxide and hydrogen produced by the process described above, still comprises unconverted carbon dioxide, the product stream exiting the separator may advantageously be repeatedly subjected to said reverse water gas shift process steps to convert further carbon dioxide present. In the process according to the present disclosure, multiple stages for the process are required if further conversion of the unconverted carbon dioxide in the product stream is required. The multiple stages are a repeat of the entire reverse water gas shift process explained above. The cooled product gas stream mainly comprising of carbon monoxide, hydrogen, unconverted carbon dioxide, thus obtained from the first reaction vessel after being subjected to cooling and separation of liquid water, is the feed to a second reverse water gas shift reaction vessel along with one or more feed streams selected from hydrogen rich gas stream and the oxygen rich gas streams from the water splitter. The product stream comprising carbon monoxide, hydrogen, water, unconverted carbon dioxide or combinations thereof, from the second reaction vessel is subjected to further cooling and separation of the liquid water from the cooled product gas stream mainly comprising carbon monoxide, hydrogen, unconverted carbon dioxide. One or more of the feed streams for the second reaction vessel selected from the product stream gas stream mainly comprising carbon dioxide, hydrogen, water, unconverted carbon dioxide, optional additional gas streams introduced into the reaction vessel as co-feed or pre-mixed gas streams, hydrogen rich gas stream and oxygen rich gas stream may be advantageously preheated using any of the preheating methods described above.

The process of this disclosure may advantageously be performed in a process unit comprising at least one reaction vessel operatively connected to a cooling unit, and further comprising a gas introduction line connected to a water splitter unit. When multiple stages for the process are required, if further conversion of the unconverted carbon dioxide in the product stream is required, this is preferably performed in a unit comprising at least two reaction vessels, each of which are operatively connected to a cooling unit, which are placed in consecutive order of a first reaction unit followed by a cooling unit and again followed by a reaction unit followed by a cooling unit, and the process unit further comprising at least one gas introduction line connected to a water splitter unit.

The process of this disclosure may advantageously be performed in multiple process units comprising one or more reaction vessels operatively connected to a cooling unit, wherein each of the reaction vessels has its own separate lines provided with valves for introduction of the different feed streams selected from hydrogen rich gas stream, methane rich gas stream, carbon dioxide rich gas stream and oxygen rich gas stream. Advantageously, the said process line-up is used for performing in each of the multiple reaction vessels a process selected from method I and method II. When desired, each process unit can advantageously and seamlessly switch mode from method I to method II or vice versa individually without affecting the other process units. The reaction vessel is oriented in an advantageous manner, either horizontal or vertical, as required by the process. The outlet of the reaction vessel is placed in an advantageous manner, either at the bottom of the vessel or at the side of the vessel. If the outlet is placed at the side of the vessel, there may exist some empty space between the bottom of the vessel and the outlet.

The process, or process steps thereof, and process unit(s) of the present invention may advantageously be integrated into processes requiring synthesis gas as a feedstock.

DESCRIPTION OF THE DRAWINGS

Legend: P refers to a process unit comprising a reaction vessel that can operate flexibly in either partial oxidation mode or reverse water gas shift mode. Q refers to (a) process unit(s) that act as syngas cooler. R is (a) process unit(s) that act as a water splitter. S is (a) process unit(s) that act as syngas cooler and water separator. All the figures illustrated are possible schematic interpretations of the present disclosure.

In FIG. 3, cooled product stream 5a is used to preheat the methane rich gas stream 1, cooled product stream 5b is used to preheat hydrogen rich gas stream 3, and steam 7 is used to preheat gas stream comprising carbon dioxide 2 and oxygen rich gas stream 4.

In FIG. 4, cooled product stream 5a is used to preheat the methane rich gas stream 1, cooled product stream 5b is used to preheat the hydrogen rich gas stream 3, and steam 7 is used to preheat gas stream comprising carbon dioxide 2 and oxygen rich gas stream 4. Unit(s) R is/are used to produce at least part of the hydrogen rich gas stream 3 and oxygen rich gas stream 4 from water 13 using an energy source 12. Excess oxygen rich gas stream 14 is taken out which can be utilized elsewhere or vented.

In FIG. 5, cooled product stream 5a is used to preheat the methane rich gas stream 1, cooled product stream 5b is used to preheat the hydrogen rich gas stream 3, and steam 7 is used to preheat gas stream comprising carbon dioxide 2 and oxygen rich gas stream 4. R is used to produce at least part of the hydrogen rich gas stream 3 and oxygen rich gas stream 4 from water 13 using an energy source 12. Excess oxygen rich gas stream 14 is taken out which can be utilized elsewhere or vented. The cooled product gas stream 5c, which is a combination of cooled product streams 5a and 5b, is further cooled to dew point in S and liquid water 16 is separated from the cooled product gas stream 15.

In FIG. 6, cooled product stream 5a is used to preheat the methane rich gas stream 1, cooled product stream 5b is used to preheat the hydrogen rich gas stream 3, and steam 7 is used to preheat gas stream comprising carbon dioxide 2 and oxygen rich gas stream 4. R is used to produce at least part of the hydrogen rich gas stream 3 and oxygen rich gas stream 4 from water 13 using an energy source 12. Excess oxygen rich gas stream 14 is taken out which can be utilized elsewhere or vented. The cooled product gas stream 5c, which is a combination of cooled product streams 5a and 5b, is further cooled to dew point in S and liquid water 16 is separated from the cooled product gas stream 15. Unconverted carbon dioxide in the product gas stream 15 is further converted to carbon monoxide by subjecting it to a second stage P2. The product gas stream 15 along with a hydrogen rich gas stream 3, oxygen rich gas stream 4 and optionally a gas stream containing carbon dioxide 2 enter P2 to form a product gas stream 17 comprising mainly carbon monoxide, hydrogen, water and unconverted carbon dioxide. The product stream 17 is cooled with water 18 to make steam 19 and cooled product stream 17' in Q2.

Hereinafter the invention will be further illustrated by the following non-limiting example.

EXAMPLE 1

Figure 1:
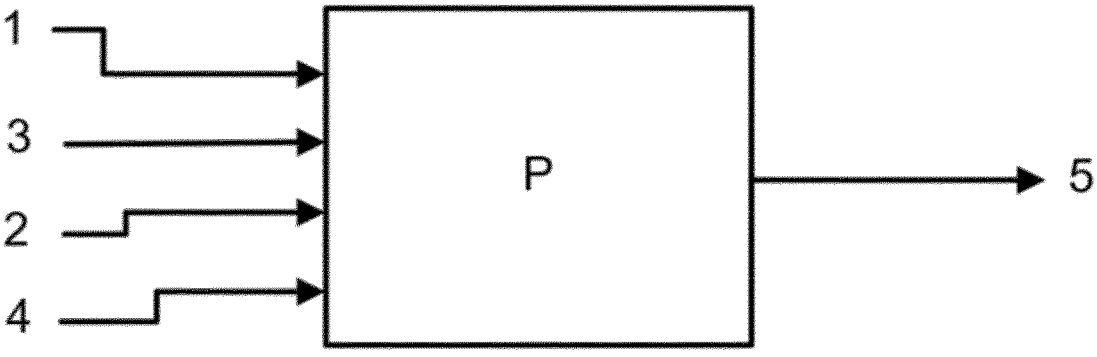
FIG. 1. Depicts an illustrative embodiment according to the present disclosure of the flexible partial oxidation and reverse water gas shift process where a methane rich gas stream 1, hydrogen rich gas stream 3, gas stream comprising carbon dioxide 2 and oxygen rich gas stream 4 enter P via a burner to form a product gas stream 5 mainly comprising carbon monoxide, hydrogen, water and possibly some unconverted carbon dioxide when operating in either method I or method II. Optional additional gas streams are not shown in FIG. 1.
Figure 2:
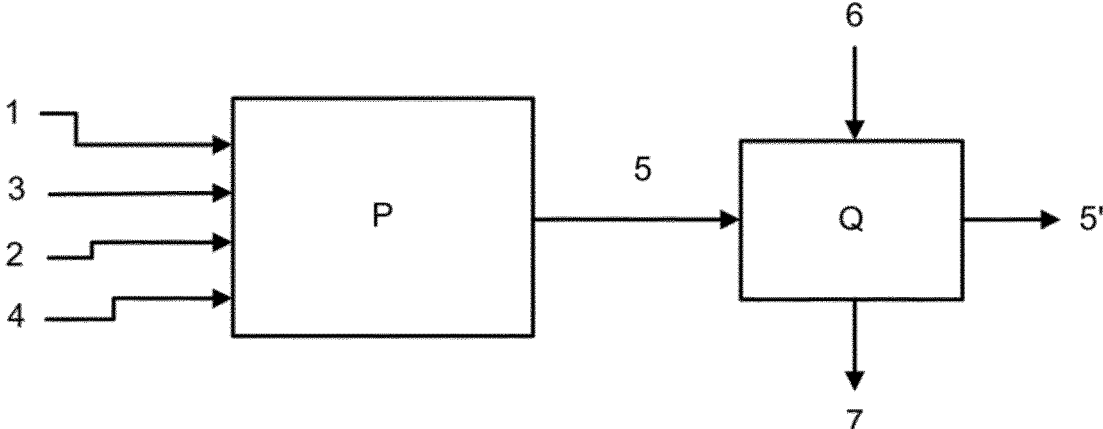
FIG. 2. Illustrates another embodiment according to the present disclosure where a methane rich gas stream 1, hydrogen rich gas stream 3, gas stream comprising carbon dioxide 2 and oxygen rich gas stream 4 enter P via a burner to form a product gas stream 5 mainly comprising carbon monoxide, hydrogen, water and possibly some unconverted carbon dioxide when operating in either method I or method II. The product stream 5 is cooled with water 6 to make steam 7 and cooled product stream 5' in Q.
Figure 3:
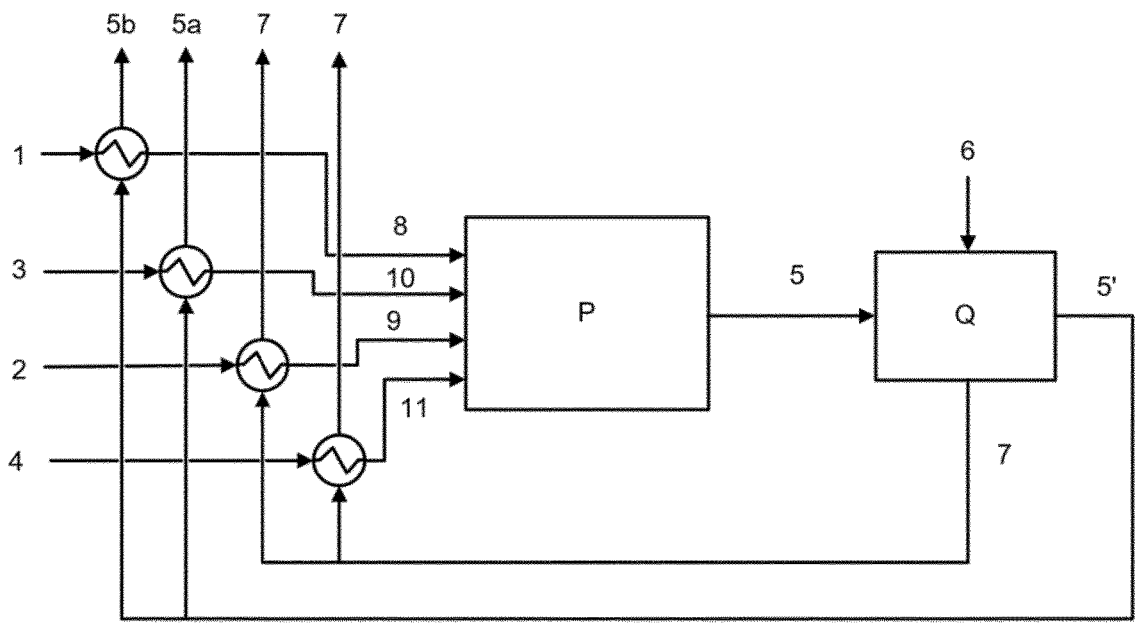
FIG. 3. Illustrates another embodiment according to the present disclosure where a preheated methane rich gas stream 8, preheated hydrogen rich gas stream 10, preheated gas stream containing carbon dioxide 9, and preheated oxygen rich gas stream 11 enter P via a burner to form a product gas stream 5 mainly comprising carbon monoxide, hydrogen, water and possibly some unconverted carbon dioxide when operating in either method I or method II. The product stream 5 is cooled with water 6 to make steam 7 and cooled product stream 5' in Q. Cooled product stream 5' is split into individual cooled product streams 5a and 5b. One or both of the cooled product streams 5a, 5b and steam 7 may be used to preheat one or more of the feed streams selected from methane rich gas stream 1, hydrogen rich gas stream 3, gas stream comprising carbon dioxide 2, and oxygen rich gas stream 4.
Figure 4:
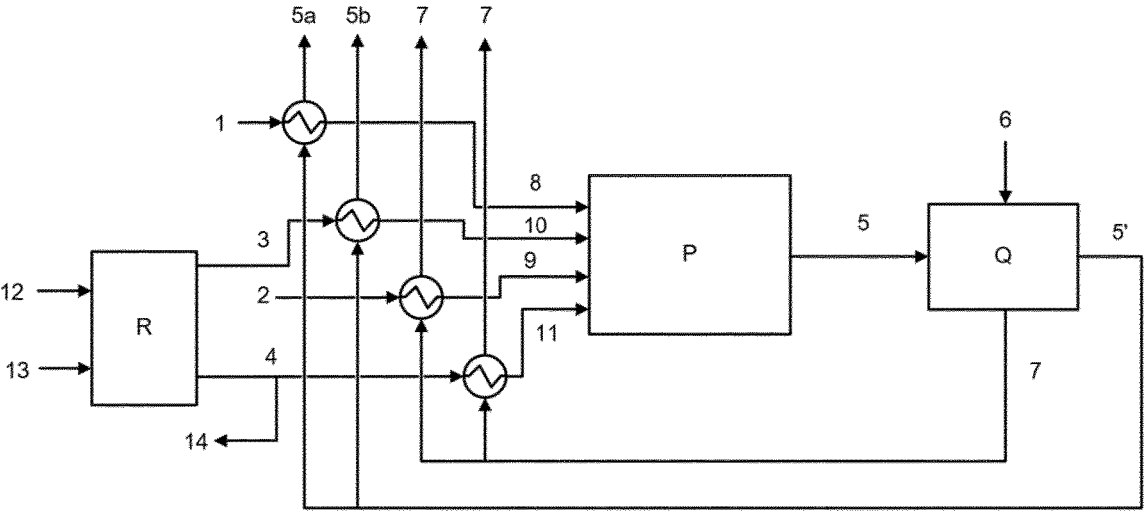
FIG. 4. Illustrates another embodiment according to the present disclosure where a preheated methane rich gas stream 8, preheated hydrogen rich gas stream 10, preheated gas stream containing carbon dioxide 9 and preheated oxygen rich gas stream 11 enter P via the burner to form a product gas stream 5 mainly comprising carbon monoxide, hydrogen, water and possibly some unconverted carbon dioxide when operating in either method I or method II. The product stream 5 is cooled with water 6 to make steam 7 and cooled product stream 5' in Q. Cooled product stream 5' is split into individual cooled product streams 5a and 5b. One or both of the cooled product streams 5a, 5b and steam 7 may be used to preheat one or more of the feed streams selected from methane rich gas stream 1, hydrogen rich gas stream 3, gas stream comprising carbon dioxide 2 and oxygen rich gas stream 4.
Figure 5:
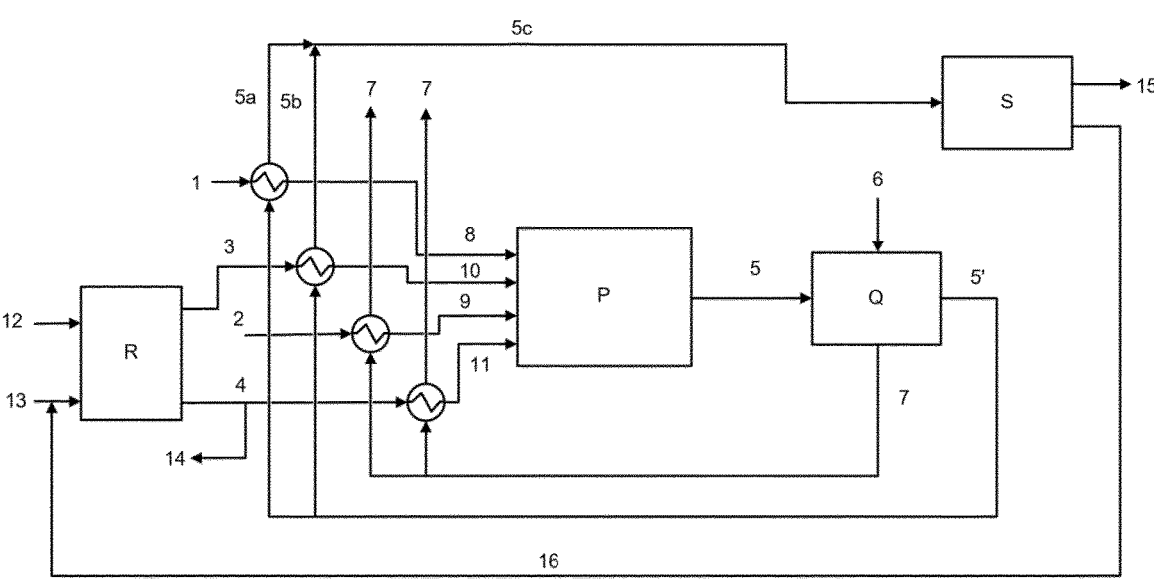
FIG. 5. Illustrates another embodiment according to the present disclosure where a preheated methane rich gas stream 8, preheated hydrogen rich gas stream 10, preheated gas stream containing carbon dioxide 9 and preheated oxygen rich gas stream 11 enter P via a burner to form a product gas stream 5 mainly comprising carbon monoxide, hydrogen, water and possibly some unconverted carbon dioxide when operating in either method I or method II. The product stream 5 is cooled with water 6 to make steam 7 and cooled product stream 5' in Q. Cooled product stream 5' is split into individual cooled product streams 5a and 5b. One or both of the cooled product stream 5a, 5b and steam 7 may be used to preheat one or more of the feed streams selected from methane rich gas stream 1, hydrogen rich gas stream 3, gas stream comprising carbon dioxide 2 and oxygen rich gas stream 4.
Figure 6:
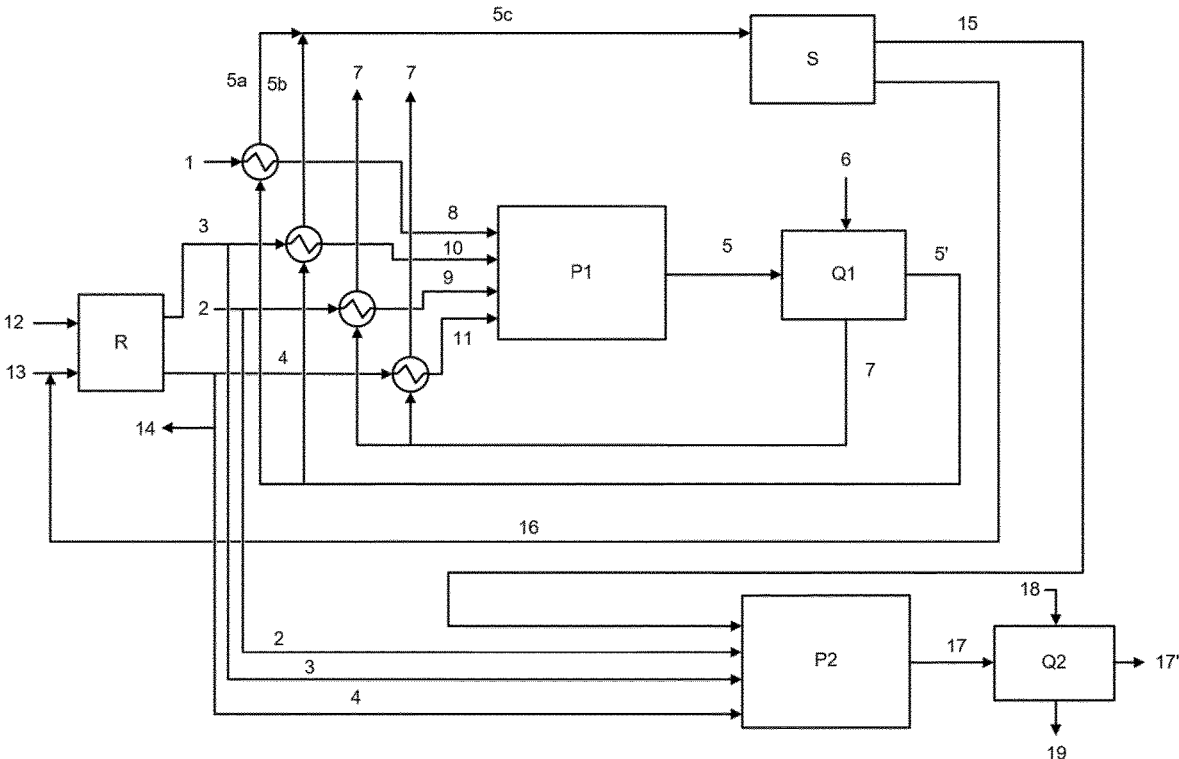
FIG. 6. Illustrates another embodiment according to the present disclosure where a preheated methane rich gas stream 8, preheated hydrogen rich gas stream 10, preheated gas stream containing carbon dioxide 9 and preheated oxygen rich gas stream 11 enter P1 via a burner to form a product gas stream 5 mainly comprising carbon monoxide, hydrogen, water and possibly some unconverted carbon dioxide when operating in either method I or method II. The product stream 5 is cooled with water 6 to make steam 7 and cooled product stream 5' in Q1. Cooled product stream 5' is split into individual cooled product streams 5a and 5b. One or both of the cooled product streams 5a, 5b and steam 7 may be used to preheat one or more of the feed streams selected from methane rich gas stream 1, hydrogen rich gas stream 3, gas stream comprising carbon dioxide 2 and oxygen rich gas stream 4.
Figure 7:
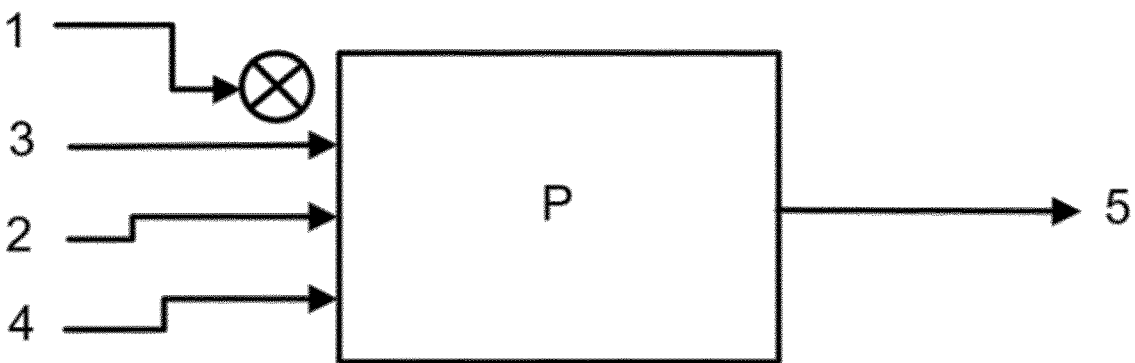
FIG. 7. Illustrates the two modes of operation of P which are method I and method II. In method I, P operates in reverse water gas shift mode, wherein the feed to P comprises hydrogen rich gas stream 3, a gas stream containing carbon dioxide 2 and oxygen rich gas stream 4 to form a product gas stream 5 comprising mainly carbon monoxide, hydrogen, water and unconverted carbon dioxide. In method II, P operates in partial oxidation mode, wherein the feed to P comprises a methane rich gas stream 1 and oxygen rich gas stream 4 to form a product gas stream 5 comprising mainly carbon monoxide, hydrogen, water and unconverted carbon dioxide. It is feasible to switch from method I to method II by stopping the flow of hydrogen rich gas stream 3 and a gas stream containing carbon dioxide 2 by closing the appropriate valves and starting the flow of methane rich gas stream 1 by opening the valve in the line for gas stream 1. For the switch from method II to method I, the flow of gas stream containing carbon dioxide 2 and hydrogen rich gas stream 3 are opened and the flow of methane rich gas stream 1 is stopped. This is done in an advantageous manner as required by the process.
Figure 7:
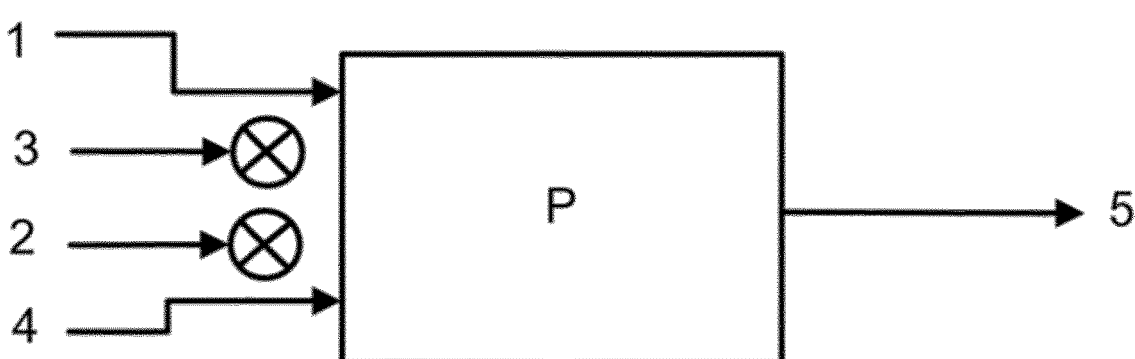
Figure 8:
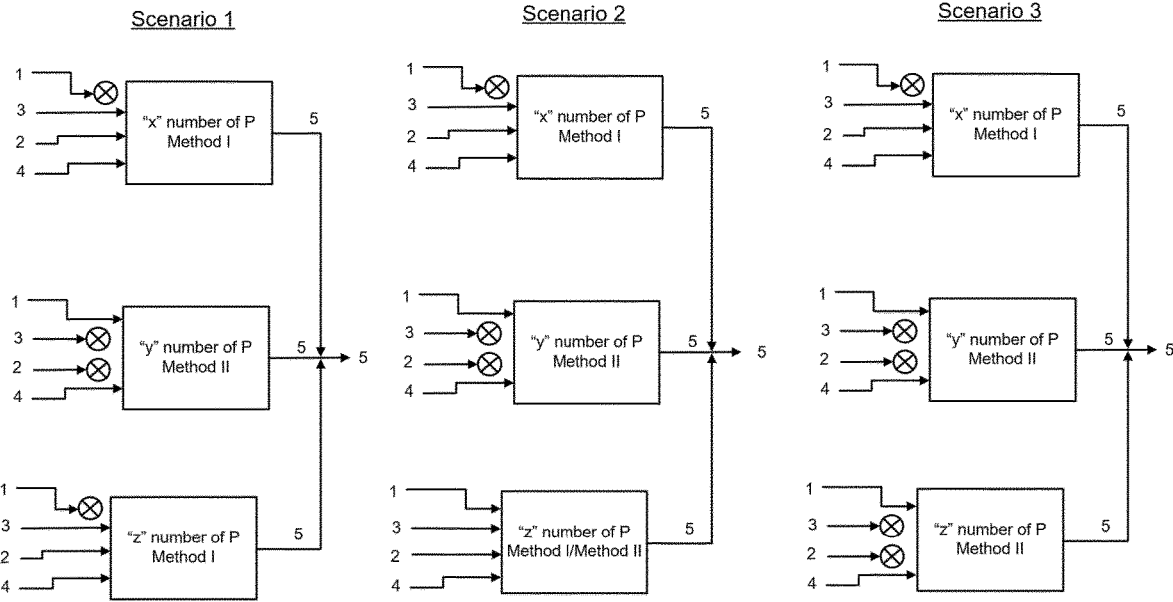
FIG. 8. Illustrates other embodiments according to the disclosure wherein the process consists of multiple units of P. In an exemplary scenario 1, there are "x" number of P operating in method I, "y" number of P operating in method II and "z" number of P operating in method I. In method I, P operates in reverse water gas shift mode, wherein the feed to P comprises hydrogen rich gas stream 3, a gas stream containing carbon dioxide 2 and oxygen rich gas stream 4 to form a product gas stream 5 comprising mainly carbon monoxide, hydrogen, water and unconverted carbon dioxide. In method II, P operates in partial oxidation mode, wherein the feed to P comprises a methane rich gas stream 1 and oxygen rich gas stream 4 to form a product gas stream 5 comprising mainly carbon monoxide, hydrogen, water and unconverted carbon dioxide. Another exemplary scenario 3 depicts a particular scenario where "z" number of P have switched from method I to method II. In scenario 3, since "z" number of P are now operating in method II, the feed to these "z" number of P comprises a methane rich gas stream 1 and oxygen rich gas stream 4 to form a product gas stream 5 comprising mainly carbon monoxide, hydrogen, water and unconverted carbon dioxide. During the switch operation for the "z" number of P from method I to method II, there exists a transition scenario 2 ("intermediate phase"). In scenario 2, the flow of gas stream containing carbon dioxide 2 and hydrogen rich gas stream 3 are stopped and the flow of methane rich gas stream 1 is opened for the "z" number of P.
Figure 9:
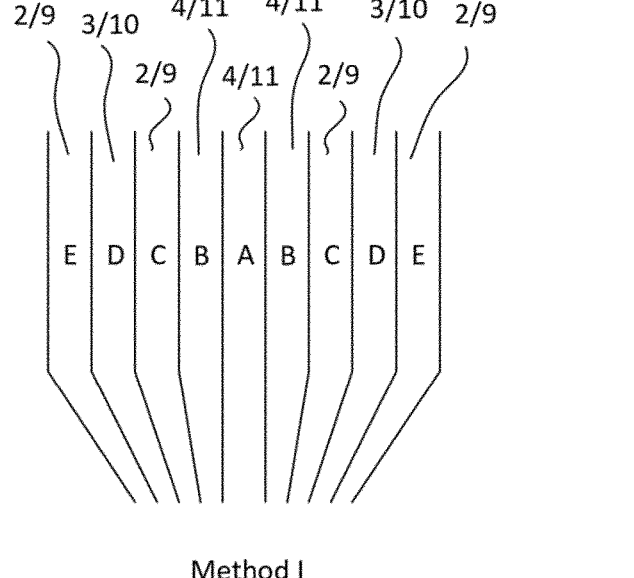
FIG. 9. Illustrates another embodiment according to the present disclosure relating to a burner that can be used in the claimed process. The burner contains five coaxial channels A, B, C, D and E. In method I, oxygen rich gas stream 4 or preheated oxygen rich gas stream 11 (i.e. gas stream 4/11) enters P via channels A and B of the burner. A portion of the gas stream comprising carbon dioxide 2 or preheated gas ments of the present disclosure as explained in FIG. 1 and FIG. 3 when operating in method I, namely reverse water gas shift reaction mode.
Figure 9:
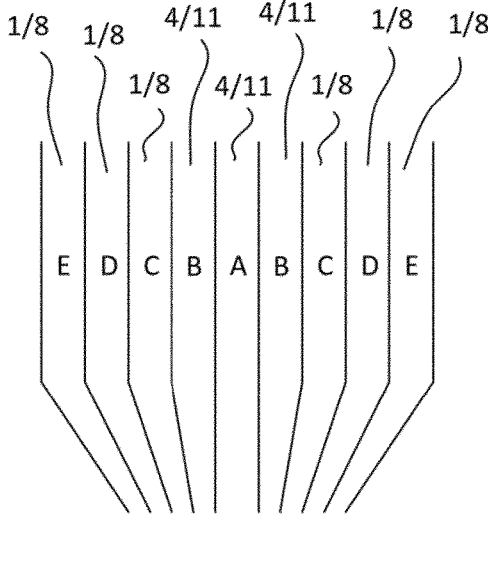

The following example refers to the processes as explained in the different embodiments of the present disclosure as described in FIG. 1 and FIG. 3. Table 1 illustrates the product stream (main product is synthesis gas) compositions at the outlet of RWGS reaction vessel for different reactor temperatures for two different cases: when the feed streams are not preheated (as illustrated in FIG. 1) and when they are preheated (as illustrated in FIG. 3). The feed $H_2$ to $CO_2$ ratio is constant for all cases. The RWGS reactor temperature is controlled by adjusting the flow of oxygen to the reactor. The synthesis gas composition results were obtained by assuming that the synthesis gas at the outlet of the RWGS reactor is at steady state thermodynamic equilibrium.

Figure 10:
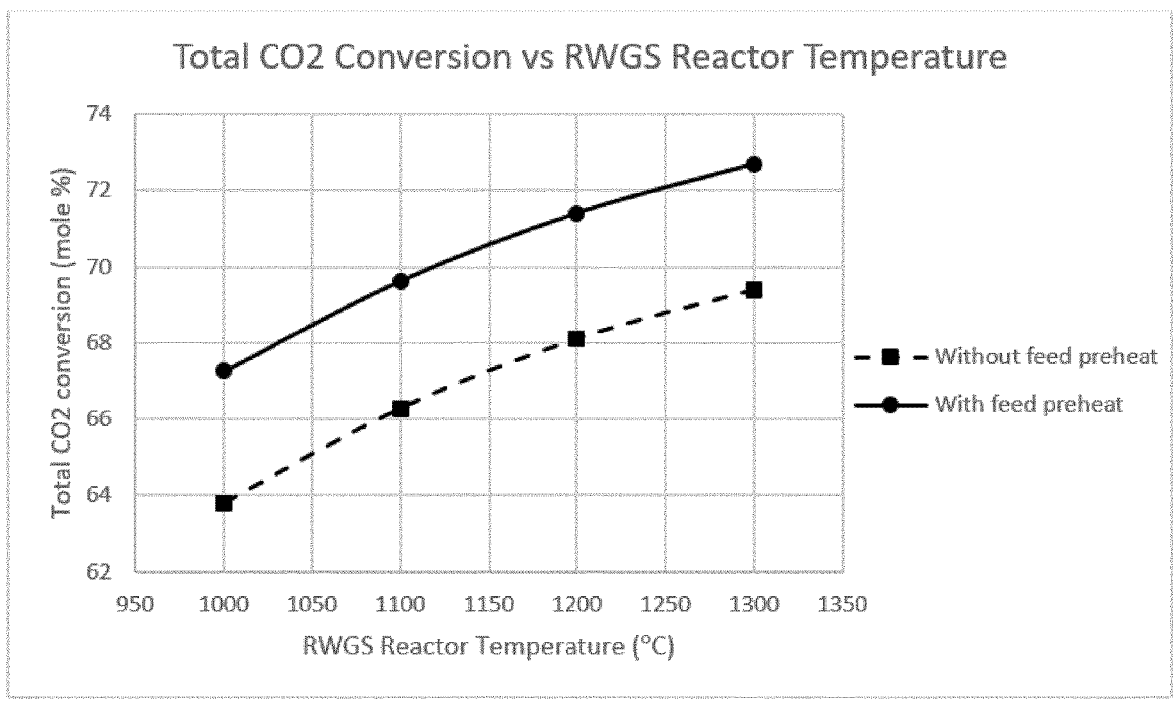
Figure 11:
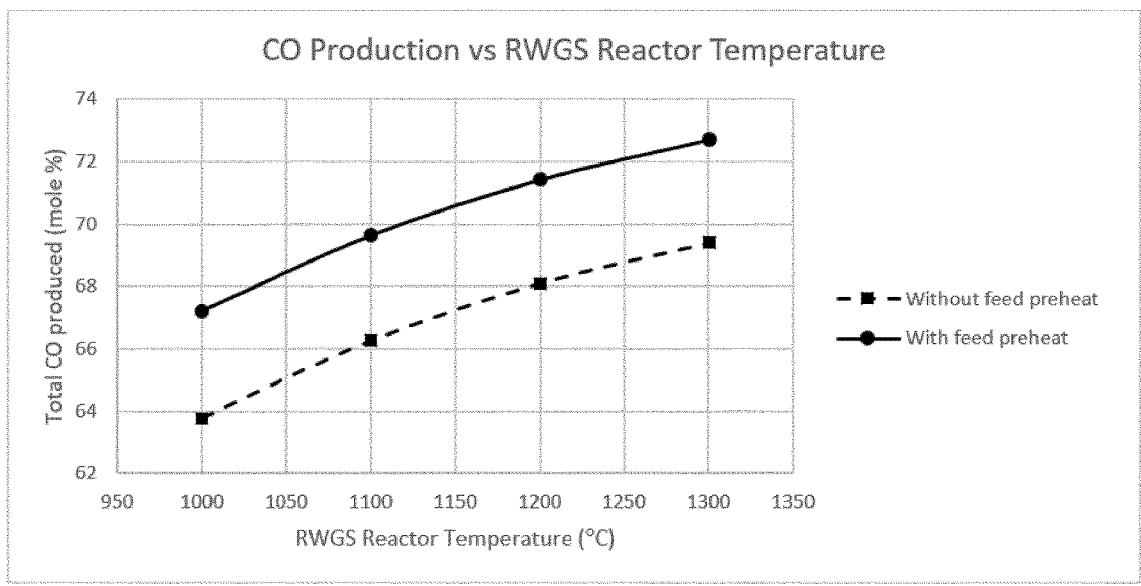

FIG. 10 and FIG. 11 illustrate the total carbon dioxide conversion and total carbon monoxide produced for different RWGS reactor temperatures for two different cases: when the feed streams are not preheated (as illustrated in FIG. 1) and when they are preheated (as illustrated in FIG. 3).

TABLE 1

| | Temp. (° C.) | | | | | | | |
|---|---|---|---|---|---|---|---|---|
| | 1000 | 1100 | 1200 | 1300 | 1000 | 1100 | 1200 | 1300 |
| $H_2/CO_2$ | 3 | 3 | 3 | 3 | 3 | 3 | 3 | 3 |
| Feed Preheat | No | No | No | No | Yes | Yes | Yes | Yes |
| | Product stream composition (mole %) | | | | | | | |
| $H_2$ | 42.25 | 39.89 | 37.66 | 35.53 | 45.04 | 42.75 | 40.59 | 38.52 |
| CO | 15.94 | 16.57 | 17.02 | 17.35 | 16.80 | 17.41 | 17.85 | 18.17 |
| $CO_2$ | 9.06 | 8.43 | 7.98 | 7.65 | 8.19 | 7.59 | 7.15 | 6.83 |
| $H_2O$ | 32.74 | 35.11 | 37.34 | 39.47 | 29.96 | 32.25 | 34.41 | 36.48 |
| $CH_4$ | 0.01 | 0.00 | 0.00 | 0.00 | 0.01 | 0.00 | 0.00 | 0.00 |
| Total | 100.00 | 100.00 | 100.00 | 100.00 | 100.00 | 100.00 | 100.00 | 100.00 | stream comprising carbon dioxide 9 (i.e. gas stream 2/9) enters P via channel C of the burner. Hydrogen rich gas stream 3 or preheated hydrogen rich gas stream 10 (i.e. gas stream 3/10) enters P via channel D of the burner. Another portion of the gas stream comprising carbon dioxide 2 or preheated gas stream comprising carbon dioxide 9 (i.e. gas stream 2/9) enters P via channel E of the burner. In method II, the oxygen rich gas stream 4 or preheated oxygen rich gas stream 11 (i.e. gas stream 4/11) enters P via channels A and B of the burner. The methane rich gas stream 1 or preheated methane rich gas stream 8 (i.e. gas stream 1/8) enters P via channels C, D and E of the burner. Alternate embodiments for the burner exist other than the illustration given above where the total number of channels, the angles of the channels and the feed streams entering P via the different burner channels may be different.

FIG. 10. Illustrates the total carbon dioxide conversion at different reactor temperatures for two different embodiments of the present disclosure as explained in FIG. 1 and FIG. 3 when operating in method I, namely reverse water gas shift reaction mode.

FIG. 11. Illustrates the total carbon monoxide production at different reactor temperatures for two different embodi-

We claim:

1. A process for converting feed streams selected from (1) a gas stream comprising carbon dioxide and a hydrogen rich gas stream; (2) a methane rich gas stream; and (3) a combination of feed streams (1) and (2) into a product stream comprising carbon monoxide, water and hydrogen, the process comprising:

introducing the feed streams selected from (1), (2) or (3) and oxygen into a reaction vessel;

in switching mode, performing method I or method II in the reaction vessel, wherein no catalyst is present, the reaction vessel being provided with a burner located at the top of the reaction vessel, the burner comprising coaxial channels for the separate introduction of the feed streams and the oxygen:

in method I, performing a reverse water gas shift reaction at an elevated temperature, wherein (a) at least feed stream (1) and an oxygen rich gas stream are introduced into the reaction vessel via the burner in separate feed streams, wherein the hydrogen rich gas stream is introduced into the reaction vessel at a temperature between 15 and 500° C., (b) the hydrogen rich gas stream and the oxygen rich gas stream being introduced in close vicinity of each other, wherein the hydrogen and the oxygen in the hydrogen rich gas stream and the oxygen rich gas stream, respectively, undergo a combustion reaction upon entering the reaction vessel, thereby providing the heating energy required for the reverse water-gas shift reaction; and (c) the temperature in the reaction vessel is maintained in the range of 1000 to 1500° C. by varying the molar ratio of the hydrogen to the oxygen, which are introduced into the reaction vessel in the hydrogen rich gas stream and the oxygen rich gas stream, respectively; and in method II, performing a partial oxidation reaction at an elevated temperature, wherein (d) at least feed stream (2) and an oxygen rich gas stream are introduced into the reaction vessel via the burner in separate feed streams, (e) the feed stream (2) and the oxygen rich gas stream being introduced in close vicinity of each other, wherein the feed stream (2) and the oxygen rich gas stream undergo the partial oxidation reaction upon entering the reaction vessel; and (f) the temperature in the reaction vessel is maintained in the range of 1100 to 1500° C. by varying the flow rate of the oxygen and/or the feed stream (2); wherein during the switching mode from method I to method II or vice versa, the feed streams are gradually changed to the relevant feed streams, so that the feed stream (3) is present in an intermediate phase, the feed streams being introduced via the appropriate channels, while also changing the temperature of the reaction vessel to the desired temperature for the relevant method.

2. The process according to claim 1, wherein the feed streams can be selected without change in equipment or stopping the process by either gradually increasing the flow of the feed stream (1) while gradually decreasing the flow of the feed stream (2), and vice versa, or by opening and closing valves of the respective feed streams feeding to the burner, while continuing the flow of the oxygen and adapting that as required.

3. The process according to claim 1, wherein, in the process, the percentage of the feed streams (1) and (2) in the feed stream (3) may be varied over time as required along with the variation of the oxygen rich gas stream.

4. The process according to claim 1, wherein the reaction vessel is preheated to a temperature ranging up to 1100° C.

5. The process according to claim 1, wherein one or more feed streams selected from the feed streams (1) and (2) along with the oxygen rich gas stream are preheated before being introduced into the reaction vessel.

6. The process according to claim 1, wherein at least part of the hydrogen rich gas stream and/or at least part of the oxygen rich gas stream in the feed streams is obtained from a water splitter.

7. The process according to claim 1, wherein, in the method I, part of the gas stream comprising carbon dioxide is introduced via a channel in between the hydrogen rich gas stream and the oxygen rich gas stream and the remaining part of the gas stream containing carbon dioxide is introduced in an outer channel of the burner, wherein the outer channel of the burner is outside of the channels for the hydrogen rich gas stream and the oxygen rich gas stream.

8. The process according to claim 1, wherein, in the method I, the oxygen rich gas stream is introduced via an inner channel(s) of the burner.

9. The process according to claim 1, wherein, in the method II, the oxygen rich gas stream is introduced via an inner channel(s) of the burner.

10. The process according to claim 1, wherein, in both of the methods I and II, the oxygen rich gas stream is introduced via an inner channel(s) of the burner.

* * * * *